United States Patent [19]

Aiba

[11] 4,415,822
[45] Nov. 15, 1983

[54] STATORS OF DYNAMOELECTRIC MACHINES

[75] Inventor: Toshiyuki Aiba, Yokohama, Japan

[73] Assignee: Tokyo Shibaura Denki Kabushiki Kaisha, Kanagawa, Japan

[21] Appl. No.: 304,906

[22] Filed: Sep. 23, 1981

[30] Foreign Application Priority Data

Oct. 3, 1980 [JP] Japan .................. 55-140495[U]

[51] Int. Cl.³ .................. H02K 1/20; H02K 9/02
[52] U.S. Cl. .................. 310/59; 310/65
[58] Field of Search .................. 310/52, 58-60, 310/64, 65

[56] References Cited

U.S. PATENT DOCUMENTS 850,116  4/1907  Mallett .................. 310/65

FOREIGN PATENT DOCUMENTS 51-81804  12/1976  Japan .
54-5095   6/1979   Japan .

Primary Examiner—John Gonzales
Attorney, Agent, or Firm—Stevens, Davis, Miller & Mosher

[57] ABSTRACT

A stator of a dynamoelectric machine comprises an iron core formed by laminating irons sheets, armature coils received in slots of the iron core, a plurality of spacer blocks extending radially in contact with an end surface of the iron core, clamping end plates for clamping the iron core, and buffer boards located between the spacer blocks. The spacer blocks include long ones located between an outer periphery of the iron core and teeth portions thereof and short ones located between the outer periphery and the bottom portions of the slots. Each of the short spacer blocks is provided with a radially extending channel formed on the side surface facing to the end surface of the iron core and the channel has gas air outlet and one end opened on the side facing to the slot bottom to form an inlet for a cooling gas.

1 Claim, 7 Drawing Figures

STATORS OF DYNAMOELECTRIC MACHINES

BACKGROUND OF THE INVENTION

This invention relates to an improvement in a stator of a dynamoelectric machine capable of effectively preventing overheating of an iron core of the stator by cooling it with a cooling gas.

In these days, in accordance with an increase in the capacity of a steam turbine driven generator (called hereinafter a turbo-generator), iron loss of teeth portions and slot bottom portions of the iron core of the stator caused by leakage magnetic flux increases, which results in the rise of the temperature of the iron core to an extent of an allowable limit.

In a stator of a turbo-generator of a prior art shown in FIGS. 1 and 2, reference numeral 1 designates an iron core of a stator formed by laminating thin sector shaped iron sheets, hereinafter called the stator core 1. Armature coils 2 are fitted in slots of the stator core 1 which is clamped between end plates 3. Between the stator core 1 and the end plates 3 are disposed outer spacer blocks 4 which include long spacer blocks 4a located between the outer periphery 1c of the stator and teeth portions 1a of the stator core and short spacer blocks 4b located between the periphery 1c and slot bottoms 1b of the stator core 1. Ventilation buffer boards 5 are attached to the outer ends of the respective long spacer blocks 4a.

When the turbo-generator rotates, a portion of magnetic flux produced by a current passing through a field coil, not shown, vertically enters into the end portion of the stator core thereby generating an eddy current by which heat is generated in the stator. The density of the heat thus generated is particularly high at the teeth portions 1a and the slot bottoms 1b.

In order to remove this heat and cool the stator core, a cooling gas is used which flows from the rotor through tips of the teeth portions towards the slot bottoms 1b through the space between the spacer blocks 4a and the armature coil 2 along the end surface of the iron core and then towards the outer periphery 1c through the space defined by the side walls of the outer spacer blocks 4a and 4b, as shown in FIG. 2. Finally, the cooling gas reaches a chamber behind the stator core through the spaces between the buffer plates 5 and the outer spacer blocks 4b.

With the stator shown in FIGS. 1 and 2, since the cooling gas flows at a relatively high speed near the teeth portions 1a, these teeth portions 1a are effectively cooled by the effect of the rotation of a rotor, not shown, but the cooling gas flows at a relatively low speed near the bottom portions 1b, particularly, the end surface wall of the iron core which is deemed to be a main heat radiation surface, so that desirable cooling effect cannot be provided for these portions.

SUMMARY OF THE INVENTION

It is an object of this invention to provide an improved stator of a dynamoelectric machine capable of preventing overheating of an iron core of the stator.

Another object of this invention is to provide a stator having outer spacer blocks each provided with a gas flow channel for passing a cooling gas.

According to this invention, there is provided a stator of a dynamoelectric machine of the type comprising an iron core formed by laminating iron sheets, armature coils received in slots of the iron core, a plurality of outer spacer blocks extending radially in contact with an end surface of the iron core, the spacer blocks including long spacer blocks located between an outer periphery of the iron core and teeth portions thereof and short spacer blocks extending radially between the outer periphery and the bottom portions of the slots, clamping end plates for clamping axially the iron sheets, and buffer boards located between said spacer blocks, and each of the short spacer blocks is provided with a radially extending channel formed on the side surface facing toward the end surface of the iron core, the channel having a gas outlet and an end opened on the side facing to the slot bottom to form an inlet for a cooling gas.

DESCRIPTION OF THE PREFERRED EMBODIMENTS

Figure 3:
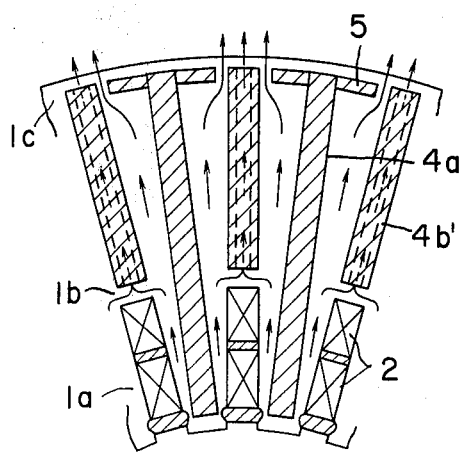
FIG. 3 is a cross-sectional view of a portion of a stator according to this invention.
Figure 4:
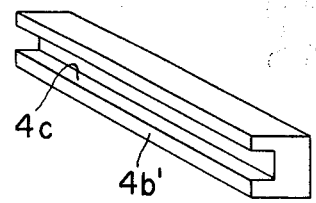
FIG. 4 is a perspective view of an outer spacer block used for the stator shown in FIG. 3.

FIG. 3 shows a portion of a stator of a dynamoelectric machine according to this invention in which each of short outer spacer blocks 4b' disposed between the slot bottoms 1b of the iron core of the stator and the outer periphery 1c thereof is provided with a longitudinal gas flow channel 4c formed as shown in FIG. 4. The outer spacer blocks 4b' are arranged in a manner that the channeled surfaces thereof face to the end surface of the stator core 1.

Figure 1:
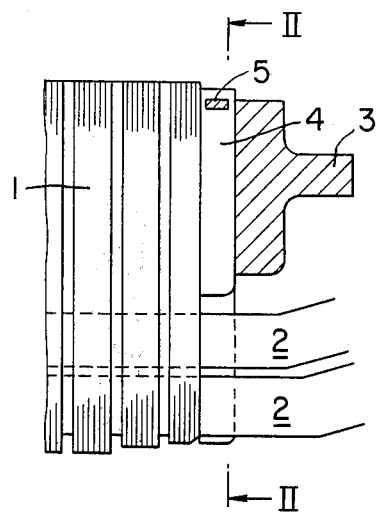
FIG. 1 shows a vertical elevation of the end portion of an iron core of a stator of a prior art dynamoelectric machine.
Figure 2:
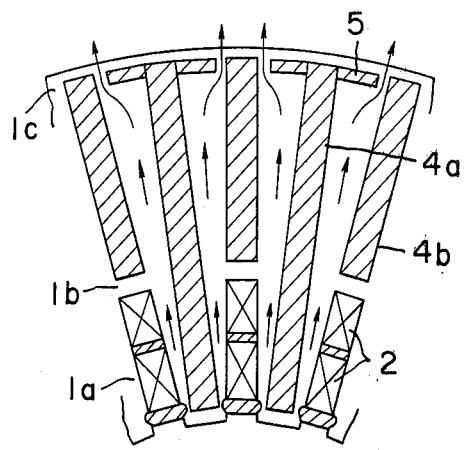
FIG. 2 is a cross-sectional view taken along the line II—II shown in FIG. 1.

During the operation of a turbo-generator, a cooling gas flows in the stator as shown by arrows in FIG. 3, that is, in addition to the cooling gas flow paths described before in conjunction with FIG. 2, the cooling gas flows from the slot bottoms 1b to the outer periphery 1c through the gas-flow channel 4c for the reason that a pressure difference is created at the inlet and outlet portions of the channel 4c caused by the difference in the gas flow speed due to the provision of the buffer board 5 at the end of the long outer spacer block 4a.

Since the inlet of the channel 4c faces to the slot bottom 1b which is largely heated by the heat generated by eddy current induced by magnetic flux, this portion is efficiently cooled by the cooling gas-flow through the gas-flow channel 4c provided for the outer spacer block 4b'. In addition to the new gas-flow passage, heat transfer surface area exposed to the cooling gas is increased by providing the channel 4c, so that the cooling effect of the stator core is highly increased.

Figure 5:
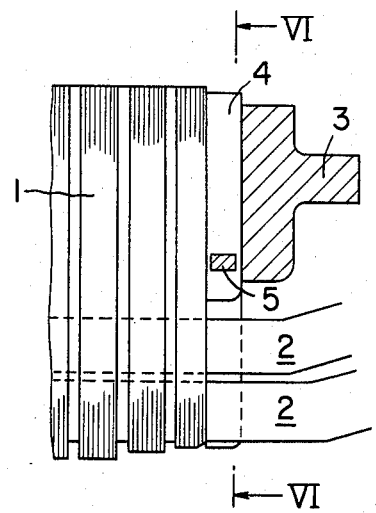
FIG. 5 shows a vertical elevation of the end portion of an iron core of a stator of another embodiment according to this invention.
Figure 6:
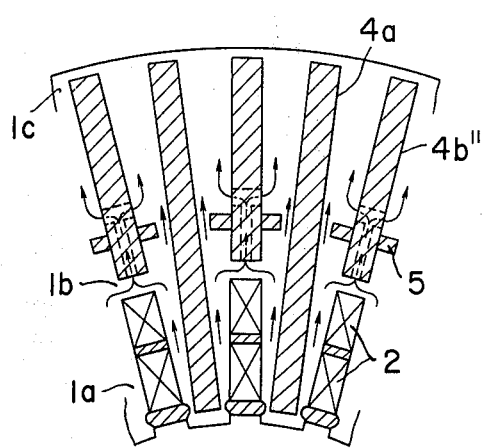
FIG. 6 is a cross-sectional view taken along the line VI—VI shown in FIG. 5.
Figure 7:
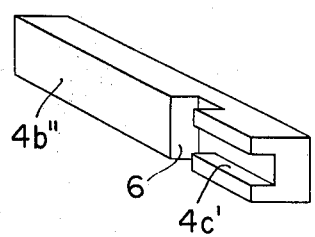
FIG. 7 is a perspective view of an outer spacer block used for the stator shown in FIG. 5 or 6.

FIGS. 5 through 7 show another embodiment according to this invention in which each outer spacer block 4b'' is provided with a gas-flow channel 4c' extending radially from one end facing to the slot bottom 1b of the stator core. The gas-flow channel 4c' terminates at and communicates with a lateral groove 6 at the inner end of the channel 4c' as shown in FIG. 7. In this embodiment, the buffer board 5 is attached to the short outer spacer block 4b" at a portion between the lateral groove 6 and the inlet end of the channel 4c'. By and by providing the buffer board 5 located as described above, the gas-flow speeds before and behind the buffer board 5 in the space between the outer spacer blocks 4a and 4b" are changed, so that the cooling gas is guided into the channel 4c' from the inlet end facing to the slot bottom 1b to flow to the groove 6 as shown by arrows in FIG. 6. The heated portion of the stator core is thus effectively cooled by the new cooling gas flow in this embodiment.

Although with the embodiments of this invention described hereinabove the long and short outer spacer blocks are alternately disposed in the circumferential direction of the stator, they can be arranged in predetermined orders, and moreover, the buffer boards may be disposed between the outer spacer blocks without being attached thereto so as to control the flow amount and speed of the cooling gas.

According to this invention, of course, the sizes of the channels 4c and 4c' and the lateral groove can be suitably selected for obtaining a desired cooling effect.

It is noted that it will be apparent to those skilled in the art that various changes and modifications may be made without departing from the spirit and the scope of this invention as defined in the appended claims.

What is claimed is:

1. In a stator of a dynamoelectric machine of the type comprising an iron core formed by laminating iron sheets, armature coils received in slots of said iron core, a plurality of spacer blocks extending radially in contact with an end surface of said iron core, said spacer blocks including long spacer blocks extending between an outer periphery of the iron core and teeth portions thereof and short spacer blocks extending between said outer periphery and the bottom portions of said slots, and clamping end plates for axially clamping said iron core, the improvement in which each of said short spacer blocks is provided with a radially extending channel formed on the side surface facing toward the end surface of said iron core, said channel having a gas outlet and an end opened on the side facing to said slot bottom to form an inlet for a cooling gas, each of said short spacer blocks being provided with a groove formed at an intermediate portion thereof and provided with end openings opened to the spaces between said short and long spacer blocks, said channel being terminated at and connected with said groove, and in which buffer boards are provided between the long and short spacer blocks to form a narrow space between said long and short spacer blocks to change gas-flow speed for effectively guiding cooling gas into said inlet and cooling said slot bottom, said buffer boards being disposed between said groove and the end opening of said channel.

* * * * *